United States Patent [19]

Murray et al.

[11] Patent Number: 4,487,646
[45] Date of Patent: Dec. 11, 1984

[54] METHOD FOR POSITIONING THE ENDS OF FIBRES IN A FIBRE OPTIC ARRAY

[75] Inventors: Paul M. Murray, Shipbourne; John M. Free, Caterham, both of England

[73] Assignee: The United States of America as represented by the Secretary of the Navy, Washington, D.C.

[21] Appl. No.: 558,132

[22] Filed: Dec. 5, 1983

[51] Int. Cl.³ .............................................. G02B 5/16
[52] U.S. Cl. .................................. 156/177; 156/296; 264/1.5; 264/277; 350/96.25
[58] Field of Search ............... 156/174, 296, 166, 180, 156/181; 350/96.25, 96.27, 96.24; 264/1.5, 2.7, 261, 275, 277, 278.1, 278

[56] References Cited

U.S. PATENT DOCUMENTS

| | | | |
|---|---|---|---|
| 3,128,167 | 4/1964 | Woodcock | 65/36 |
| 3,236,710 | 2/1966 | Curtiss | 156/167 |
| 3,586,562 | 6/1971 | Jones | 350/96.24 |
| 3,666,347 | 5/1972 | Kitano et al. | 350/96.25 |
| 3,864,017 | 2/1975 | Cole | 350/96.24 |
| 4,080,045 | 3/1978 | Nakatsubo et al. | 350/96.24 |
| 4,099,833 | 7/1978 | Tosswill | 350/96.25 |
| 4,202,599 | 5/1980 | Tosswill | 350/96.25 |

FOREIGN PATENT DOCUMENTS 12901  7/1980  European Pat. Off. ......... 350/96.21

*Primary Examiner*—Michael Ball
*Attorney, Agent, or Firm*—Robert F. Beers; Robert W. Adams

[57] ABSTRACT

An optic fibre is wound around a drum and a strip of flexible adhesive is applied across the width of the winding to maintain the relative positions of individual turns of the winding. The fibre turns and adhesive are then cut across the width of the winding and the resultant ribbon is unwrapped from the drum. One end face of the adhesive in which the cut ends of the fibres are secured is then cut such that the axes of the fibres assume a predetermined orientation relative to the cut end face. The cut end face is then applied against the surface of a former of predetermined shape and the fibre ends are secured in the positions they have assumed. A radial fibre arrangement is obtained by cutting the end face normal to the fibres and using a cylindrical former.

6 Claims, 8 Drawing Figures

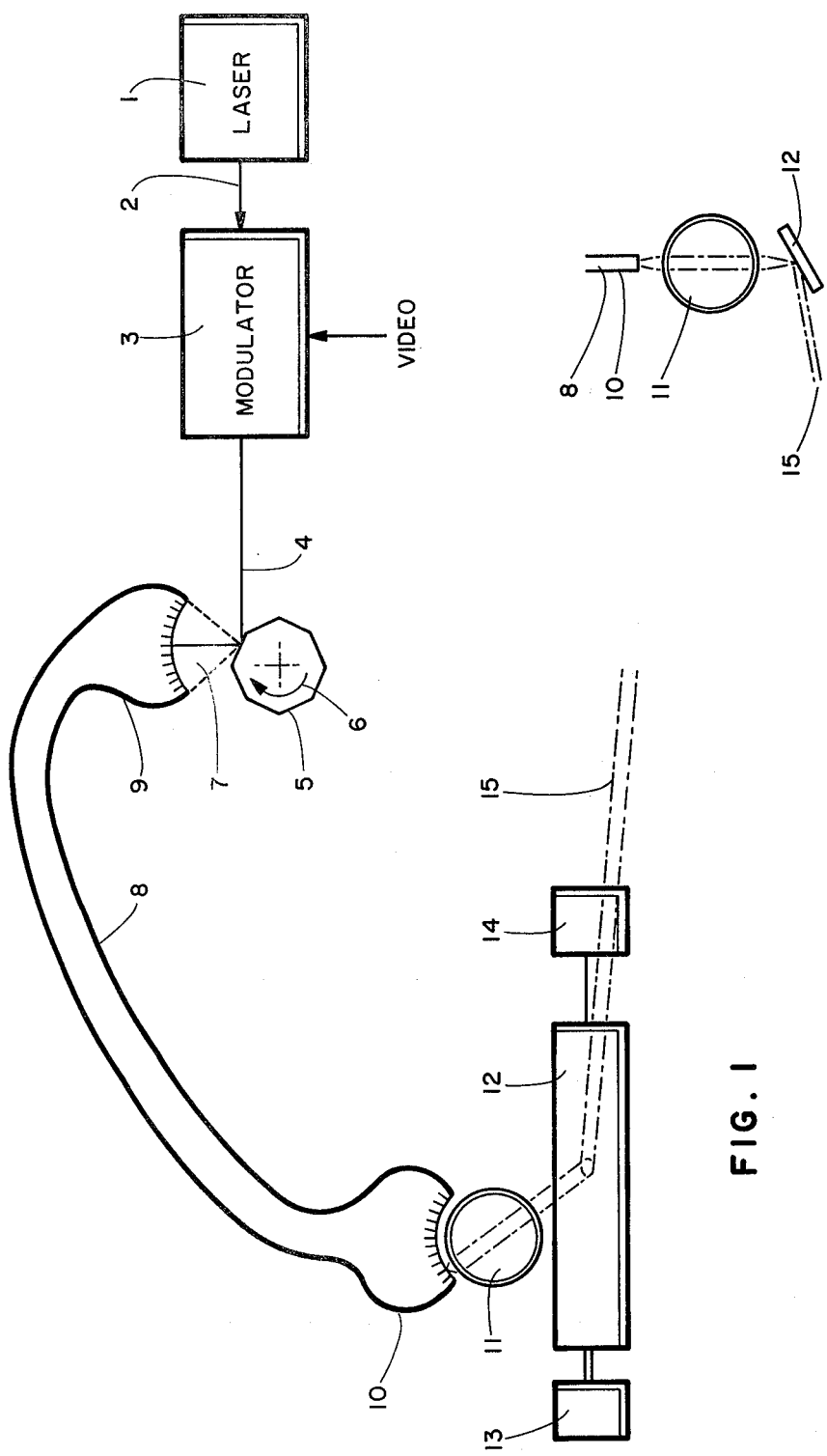

METHOD FOR POSITIONING THE ENDS OF FIBRES IN A FIBRE OPTIC ARRAY

BACKGROUND OF THE INVENTION

The present invention relates to a method for positioning the ends of fibres in a fibre optic array.

Image projection systems are known in which it is desired to project a television image onto one side of a screen of, for example, spherical shape. In such systems it may be advantageous to produce a line scan which is transmitted down a fibre optic ribbon to a projection lens and a frame scanner in the form of an oscillating mirror, or else to project in some other way the image produced in a fibre optic array.

If it is desired that the projected image subtends a large angle such as 90° from the projection point, then the projection lens can conveniently be spherically symmetric with the output end of the fibre optic array arranged in a predetermined orientation relative to the lens. The optic fibres making up the array must be very accurately positioned so as to be radially directed relative to the centre of spherical symmetry.

It is known to manufacture a fibre optic ribbon by winding an optic fibre around a drum, applying a strip of adhesive across the width of the winding to maintain the relative positions of individual turns of the winding, cutting through the fibres and the strip of adhesive across the width of the winding so that the severed ends of the fibre are secured by the adhesive on both sides of the cut, and then unwrapping the resultant ribbon from the drum.

The above method provides a coherent fibre optic ribbon, there being a one to one correspondence between fibres at each end, but a ribbon unsuited for wide angle projection unless the individual fibres at the cut ends are then re-positioned and re-directed appropriate to such projection. Such positioning, as taught in the present invention, allows a further exploitation of whatever projection lens or mirror is used. For example, conventional lenses have symmetry about one single axis and will best image the light from any given fibre only when that fibre is orientated appropriately for its position. In this case, though each fibre-image will be optimised, image quality will be unequal. In contrast, in for example the case of lenses with optical symmetry about a point, the fibres can be positioned so that performance is simultaneously both optimum and equal for every fibre across the entire field of view.

SUMMARY OF THE INVENTION

According to the present invention, there is provided a method for positioning the ends of fibres in a fibre optic array such that each fibre terminates at a surface of predetermined shape and has its axis arranged in a predetermined direction relative to that surface, wherein the fibre optic array comprises a flexible support, the ends of the fibres terminating in an end face of the support, characterized in that the end face is cut such that the axis of the end of each fibre is arranged in a predetermined orientation relative to the cut end face, which predetermined orientation corresponds to the said predetermined direction which the fibre is to adopt relative to said surface of predetermined shape, the cut end face is then applied against the surface of a former, the shape of the former surface corresponding to the said surface of predetermined shape, and the fibre ends are secured in the relative positions which they have adopted.

Where it is desired to secure the fibre optic ribbon direct to a lens for example, the lens may be used as the former and the fibres may be permanently secured to the lens. Alternatively, where it is desired to position the ribbon end spaced from for example a lens, the ribbon end is removed from the former after the fibres are secured in the relative positions which they have adopted.

Preferably, the end face is cut such that the axis of the end of each fibre is normal to the cut end face, and the former surface is spherical, whereby the ends of the fibres are directed radially when secured in the relative positions which they have adopted. The fibre ends may be secured in the relative positions which they have adopted by an adhesive. A further securing means may be positioned behind the adhesive.

The fibre optic ribbon may be manufactured by winding an optic fibre around a drum, applying a strip of flexible adhesive across the width of the winding to maintain the relative positions of individual turns of the winding, cutting through the adhesive and fibres across the width of the winding, and unwrapping the resultant ribbon from the drum. Preferably the adhesive is applied to the winding by positioning a mould piece on the winding, positioning side pieces above and below the winding adjacent the mould piece, introducing the adhesive into the mould defined by the mould piece and the side pieces, and, after curing of the adhesive, cutting through the adhesive, the side pieces and the turns of the winding secured therein to form said end face between the side pieces, the side pieces stiffening the adhesive to facilitate cutting of the said end face and being subsequently cut from the adhesive prior to the application of the cut end face against the former.

An embodiment of the invention will now be described, by way of example, with reference to the accompanying drawings, in which:

BRIEF DESCRIPTION OF THE DRAWINGS

FIG. 1 is a schematic diagram of an image projection system incorporating a fibre optic ribbon, the fibre ends of which have been positioned in accordance with the present invention;

FIG. 2 is a side view of the frame scanner of FIG. 1;

DESCRIPTION OF A PREFERRED EMBODIMENT

Figure 3:
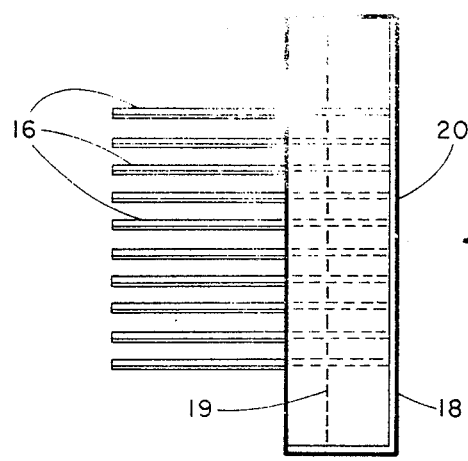
FIG. 3 is a plan view of one end of the fibre optic ribbon at an intermediate stage in its manufacture.

Referring to FIG. 1, a laser beam source 1 provides an output laser beam 2 which is directed through a full colour modulator 3. Both the laser beam source 1 and the modulator 3 are of known form. The full colour modulated beam output is indicated by numeral 4 in FIG. 1. For the sake of simplicity, intermediate beam splitters are not shown.

A line scanner, also of known form, comprises a synchronously driven polygonal section mirror drum 5 which rotates continuously in the direction shown by the arrow 6 to sweep the beam 4 over a scan path 7. One pass occurs for the movement of each mirror facet of the mirror drum 5 past the beam 4.

A fibre optic ribbon 8 is formed with planar ends 9,10. There is a one to one correspondence between the position of individual fibres at each end 9,10 of the ribbon 8. The fibres at the input end 9 of the ribbon 8 are arranged in an arc, the length of which corresponds to the width of the scan path 7 so that the modulated beam 4 is scanned along the arc for each line of the image to be projected.

At the output end 10 of the ribbon 8 the individual fibres are similarly formed into an arc, the fibres being positioned in the same order at the two ends 9 and 10, so that the scanned image line at the input end 9 is exactly reproduced at the output end 10.

The end of each fibre in the ribbon output end 10 is spaced from and directed radially with respect to a spherical projection lens 11. The ends of all the individual fibres are equidistant from the centre of the lens 11. Thus the output end 10 of the ribbon 8 must describe an arc of a circle and the individual fibre ends must be perpendicular to that arc. The ends of the individual fibres are arranged parallel to the tangent of the sphere at the point where the fibre axis intersects the sphere and therefore light emitted along the fibre axis at the output end of each fibre is projected through the centre of the sphere. Light emitted at an angle to the fibre axis will be focussed by the lens 11.

The emergent rays from the output end 10 of the ribbon 8 are focussed by the spherical lens 11 onto the face of a frame scanning mirror 12. Each scanned image line is required to subtend a large angle (e.g. 90°) from the frame scanning mirror 12, and this is achieved using the spherical projection lens 11. The frame scanning mirror 12 is reciprocated by motors 13 and 14.

The emergent rays are reflected from the mirror 12, as represented by beam 15 to form a single line of the image. As the mirror 12 is moved, successive lines of the image are projected to form the entire projecting image.

FIG. 2 shows, in side view, the output end 10 of ribbon 8, the spherical lens 11, the mirror 12 and the reflected beam 15 as described above with reference to FIG. 1.

FIGS. 3–7 illustrate the method of manufacture of the fibre optic ribbon 8.

The first step in the manufacture of the ribbon 8 is to wind a single optic fibre around a drum so as to produce a single layer winding. Adhesive is applied across the width of the winding in a controlled manner by, for example, lying a mould piece on the winding, positioning stiffened side pieces adjacent the mould piece above and below the winding, and introducing adhesive into the mould defined by the mould piece and the side pieces. The adhesive adheres to the side pieces but not to the mould piece. After an appropriate curing period, the mould piece is removed and the side pieces, the adhesive and the turns of the fibre winding secured within the adhesive are cut through along a line normal to the fibres. The winding is then unrolled to produce a ribbon of fibres in which each fibre has a length equal to the winding circumference with a one to one correspondence between fibres at each end.

Figure 4:
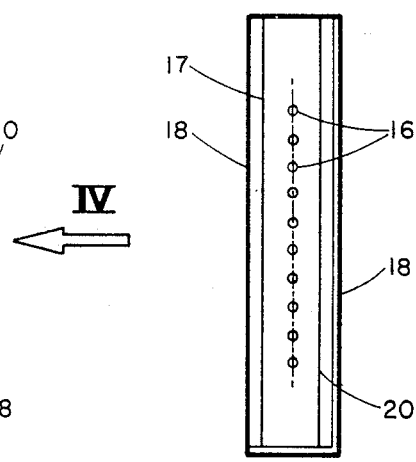
FIG. 4 is an end view of the fibre optic ribbon of FIG. 3 looking in the direction of arrow IV.

FIGS. 3 and 4 show one end of the fibre optic ribbon 8 which results from the above procedure. Individual fibres 16 are secured in a strip of adhesive 17 between stiffened side pieces 18. The fibres 16 pass through the adhesive 17 from surface 19 (formed by the mould piece referred to above) to end face 20 (formed by cutting through the adhesive 17 and side pieces 18).

Figure 5:
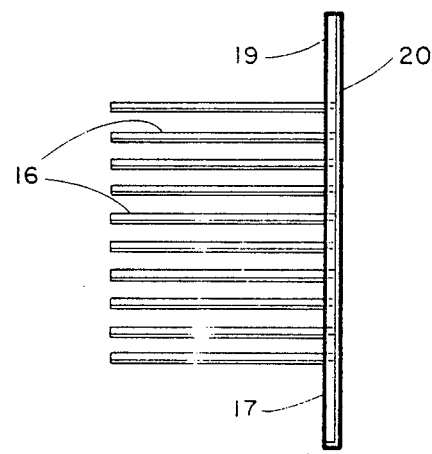
FIG. 5 is a plan view of the fibre optic ribbon at a subsequent intermediate stage in its manufacture.
Figure 6:
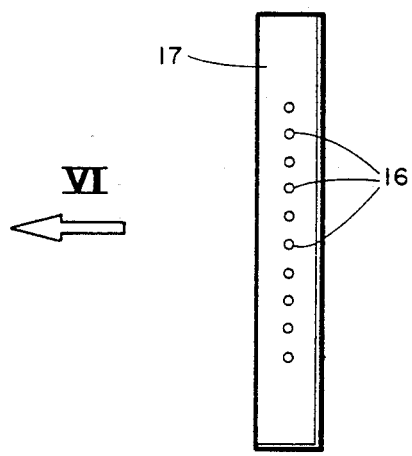
FIG. 6 is an end view of the fibre optic ribbon of FIG. 5 looking in the direction of arrow VI.
Figure 7:
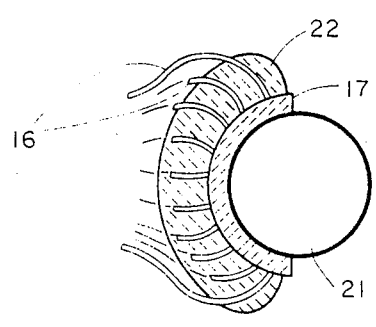
FIG. 7 is a plan view of the fibre optic ribbon of FIG. 5 placed in contact with a forming cylinder.

FIGS. 5 and 6 show the next stage in the manufacture of the fibre optic ribbon 8. End face 20 is cut back towards surface 19, the side pieces 18 providing extra rigidity to the strip of adhesive whilst this is done. When the thickness between the surfaces 19 and 20 is sufficiently small, the side pieces 18 are cut away leaving a thin flexible strip of adhesive 17 holding the optic fibres 16. The cutting back of the end face 20 is effected such that the cut ends of the fibres are planar and normal to the direction of the fibres.

In the final stage of manufacture the thin flexible strip of adhesive 17 is shaped around a cylindrical former 21 (FIG. 7) of the required curvature. The fibres 16 will now be radial to the axis of the forming cylinder 21. To ensure that they maintain this position when the former is removed, additional adhesive 22 is applied over the flexible strip 17 and around the fibres 16.

Figure 8:
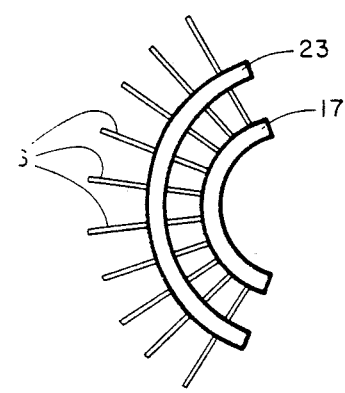
FIG. 8 is a plan view of a further fibre optic ribbon embodying the fibre ends positioned in accordance with the invention.

Both ends of the fibre optic light guide ribbon may be treated in this way, the curvature of the formers used being appropriate to the requirements of the input and output ends 9,10 of the fibre optic ribbon 8.

Where further support is required to ensure the fibres are held radially, a second such flexible strip 23 maybe installed behind the first flexible strip 17, as shown in FIG. 8. This additional flexible strip would be stretched around a larger radius, slotted, cylindrical former.

In the above description, reference is made to "individual fibres." It will be appreciated that these individual fibres may be in the form of bundles of fibre strands rather than a single strand.

It will be appreciated that a multi-layer ribbon could be produced by the method described above by forming a multi-layer winding on the drum.

Obviously, many modifications and variations of the present invention are possible in light of the above teachings. It is, therefore, to be understood that within the scope of the appended claims the invention may be practiced otherwise than as specifically described.

What is claimed is:

1. A method for positioning the ends of fibres in a fibre optic array such that each fibre terminates at a surface of predetermined arcuate shape and has its axis arranged substantially radially to that surface, comprising the steps of:

positioning said fibres in a flexible support;

cutting an end face through said flexible support such that the axis of each fibre is arranged in a predetermined orientation relative to said cut end face corresponding to the substantially radial direction the fibre is to adopt relative to said arcuate surface of predetermined shape;

applying said end face against the surface of a former, the shape of the former surface being arcuate and corresponding to said surface of predetermined shape; and securing said fibre ends in the relative positions they thereby adopt.

2. The method of claim 1 further characterized by:

cutting the end face such that the axis of each fibre is normal to said cut end face; and utilization of a spherical former surface, whereby the ends of said fibres are directed radially when secured in the relative positions which they have adopted.

3. The method of claim 2 wherein said securing step comprises securing said fibre ends in their relative positions by means of an adhesive, backing said flexible support and encasing said fibres.

4. The method of claim 3 wherein a further securing means is positioned behind said adhesive.

5. The method of claim 1 wherein said positioning step comprises:
   winding an optic fibre around a drum;
   applying a strip of flexible adhesive across the width of the winding;
   cutting through said adhesive and fibres across the width of the winding; and
   unwrapping the resultant ribbon from said drum.

6. The method of claim 5 wherein said adhesive applying step comprises:
   positioning a mould piece on the winding;
   positioning side pieces above and below the winding adjacent said mould piece;
   introducing adhesive into the mould defined by said mould piece and side pieces;
   curing said adhesive;
   cutting through the adhesive, the side pieces and the turns of winding secured therein to form said end face between said side pieces; and
   cutting said side pieces from said adhesive.

* * * * *